Feb. 23, 1971  C. HENRY  3,564,669
ROPE CLAMP
Filed July 14, 1969
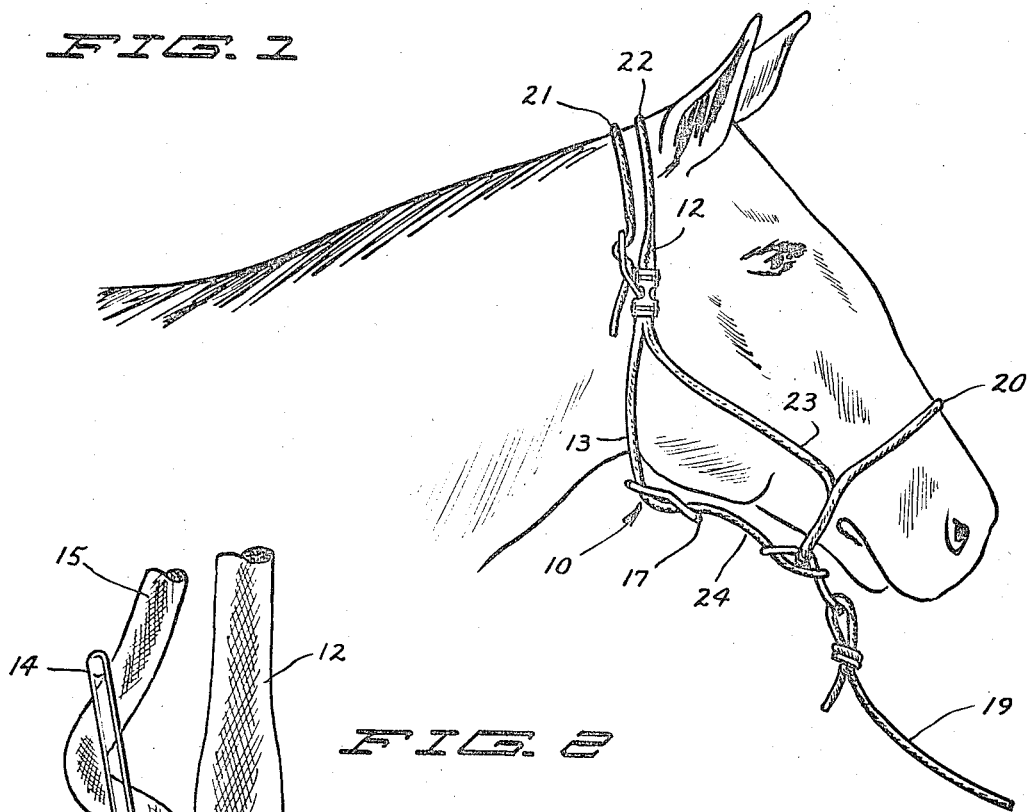
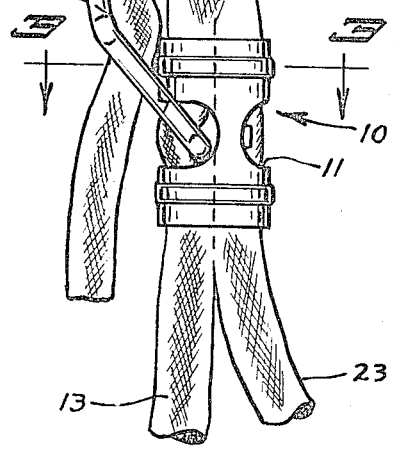
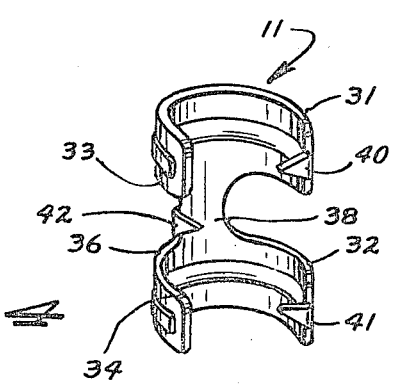
INVENTOR.
COLONEL HENRY
BY
Orrin M. Haugen
ATTORNEY United States Patent Office 3,564,669
Patented Feb. 23, 1971

3,564,669
ROPE CLAMP
Colonel Henry, Lawton, Iowa 51030
Filed July 14, 1969, Ser. No. 841,312
Int. Cl. F16g 11/00
U.S. Cl. 24—123                                    4 Claims

ABSTRACT OF THE DISCLOSURE

A rope clamp comprising a main clamping jaw having a central axis, a central bight zone along said axis, first and second pairs of laterally disposed clamping ears, one on either side of said central axis, and a pair of transverse recesses formed on opposite sides of said central axis and between individual ears of each of said pairs of ears and defining a connecting link zone therebetween, locking teeth with pointed tips extending outwardly from the ends of each of the clamping ears of said first pair of ears and from the edge surface of said connecting link in oppositely disposed relationship from the first pair of ears. Each of the locking teeth is provided with a pointed tip for impaling a rope section held within said jaw, the axis of each of said locking teeth being arranged generally parallel to the axis of said jaw.

---

The present invention relates generally to rope clamping means, and more particularly to rope clamping means having pointed teeth projecting from portions thereof for impaling rope sections held within the clamping means. More specifically, the invention relates to a rope clamp which is particularly suited for use in connection with horse halters or the like, and which has locking means for securely holding the material forming the halter, and also for receiving or accommodating adjusting links or the like. The present device is designed so as to securely hold and retain rope segments therein so as to avoid the inadvertent withdrawal or a loss of a rope segment held captive by the rope clamping means.

In the manufacture, preparation, and fabrication of devices fabricated essentially entirely from braided or woven rope, it is frequently desirable to provide clamping means for holding or retaining segments of the rope in captive relationship. These clamps must necessarily provide adequate strength to match the strength requirements and capabilities of the rope, and also provide a certain degree of ductility for appropriate working of the clamp during fabrication operations. Unfortunately, as the strength capability of ropes increases, the clamps must be formed in a fashion so as to accommodate this added strength characteristic so as to be capable of retaining or holding the rope segment without loss due to destructive bending or twisting of the clamp or portions thereof. In other words, the strength of the rope clamp means must be consistent with the strength of the rope, this requirement being preferably met without adding or increasing the rigidity of the clamp while sacrificing its resilient characteristics. In other words, it is preferable to design the rope clamping structure so as to enable it to retain the rope without adversely affecting or diminishing its working characteristics.

In accordance with the present invention, a rope clamp has been devised which has high strength, and which remains workable so as to permit preparation and fabrication without requiring expensive tooling or the like. The strength characteristics of the rope clamp are achieved as a result of structural design, rather than increasing the thickness or weight of the device.

In accordance with the present invention, a rope clamp is provided which has a clamping jaw with a central axis defining a central bight zone with first and second pairs of laterally disposed clamping ears on either side of the axis. One set of clamping ears is provided with locking teeth which are adapted to impale a section of rope held within the jaw, and a third locking tooth is provided adjacent a recessed area formed on the opposite side of the central axis from the ears carrying the locking teeth. This arrangement permits ready working of the clamp, and provides a maximum degree of strength or rigidity to the clamping structure without permitting failure of the clamping device to occur which may result in loss of the captive rope sections or segments. At least one of the transverse recesses is arranged so as to permit hardware for other sections or parts of the device being fabricated to be received and retained within the rope clamping means. The device, as previously indicated, is particularly adapted for use in connection with horse halters and the like.

It is therefore an object of the present invention to provide an improved rope clamp means which is particularly adapted for use in connection with horse halters.

It is yet a further object of the present invention to provide an improved rope clamping means which has improved locking teeth formed therewith, the axis of the teeth being arranged generally in alignment with the axis of strain which will be exerted on the clamp by the rope during use.

It is yet a further object of the present invention to provide an improved rope clamp which is adapted for use in connection with locking a pair of rope sections in captive relationship, one to another, while further permitting rope clamping hardware to be locked and retained within the bight zone of the rope clamp structure.

Other and further objects of the present invention will become apparent to those skilled in the art upon a study of the following specification, appended claims, and accompanying drawing wherein:

FIG. 1 is a side elevational view of the rope clamping means of the present invention utilized in the preparation of a horse halter, the halter so fabricated being shown attached to the head of a horse;

FIG. 2 is a detailed view of a rope clamping means of the present invention being utilized in a horse halter, and being shown on a slightly enlarged scale;

FIG. 3 is a sectional view taken along the line and in the direction of the arrows 3—3 and showing the cross section of the rope clamp; and FIG. 4 is a perspective view of the rope clamp of the present invention.

In accordance with the preferred modification of the present invention, and particularly as illustrated in the drawings, the rope and clamp assembly generally designated 10 includes a clamping jaw generally designated 11 shown in combination with rope sections 12 and 13, along with a rope buckle member 14 to which is secured rope segment 15. The assembly as shown in FIG. 1 is in the form of a halter assembly which assembly includes the conventional hardware or rope guides as at 17, along with lead rope receiving link 18. A lead rope is shown attached to link 18 as at 19.

The remaining portions of the halter device are conventional, including a nose piece 20, the head piece which is formed from segments 21 and 22, along with the side piece 23. The conventional lower yoke section is shown as at 24.

Turning now to the details of the rope clamping means of the present invention, and with particular attention directed to FIGS. 3 and 4 of the drawing, the clamping jaw 11 is shown with a central axis extending in the direction of the rope received therein. A central bight zone is shown at 30 in FIG. 3, the jaw 11 having a first pair of clamping ears as at 31 and 32, along with a second pair of clamping ears as at 33 and 34. As is indicated, these pairs of ears are arranged in laterally disposed relationship on opposite sides of the central axis. A pair of transverse recesses are shown, particularly as at 35 and 36, these recesses being formed on opposite sides of the central axis and between the individual ears. A connecting link zone 38 is shown between the ears. At the tip of ears 31 and 32, a pair of locking teeth are shown as at 40 and 41, these teeth extending outwardly and in continuation from the ends of each of the clamping ears 31 and 32 respectively. The edges of the teeth 40 and 41 are preferably beveled so as to permit ready impaling of a rope section held within the jaw. A third tooth is shown as at 42.

In the design of this structure, the deeper recessed area, particularly that area shown at 35, is straddled by ears 31 and 32 which contain the locking teeth 40 and 41 respectively. These teeth are adapted to impale the rope section, such as the rope section 13 as shown in FIG. 3, the tooth 40 being shown as impaling at least 50 percent of the thickness of the rope section 13. A similar situation exists in connection with the locking tooth 42, this tooth engaging and extending through a substantial portion of rope section 12. Thus, it will be observed that the individual ears cooperate to bind, hold and secure the individual rope segments or sections in a taut fashion, and also permit considerable latitude with the type of locking members or the like which may be engaged and retained by the individual clamping jaw.

It will be observed that the three individual locking teeth cooperate to retain the pair of lines passing through the jaw, and the disposition of these individual locking teeth permit considerable latitude to the operator in initially retaining individual rope sections in place, and subsequently treating the locking ears so as to rigidly hold the rope sections in place.

What is claimed is:
1. Rope clamp means comprising:
    (a) a clamping jaw having a central axis, a central bight zone along said axis, first and second pairs of laterally disposed clamping ears, one on either side of said central axis, and a pair of transverse recesses formed on opposite sides of said central axis and between individual ears of each of said pairs of ears, and defining a connecting link zone therebetween;
    (b) locking teeth with pointed tips extending outwardly and in continuation from the ends of each of the clamping ears of said first pair of ears and from the edge surface of said connecting link in oppositely disposed relationship from said first pair of ears;
    (c) each of said locking teeth having a pointed tip for impaling a rope section held within said jaw, the axis of each of said locking teeth being arranged generally parallel to the axis of said jaw.

2. The rope clamp means as defined in claim 1 being particularly characterized in that one of said transverse recesses extends inwardly a greater distance than the other.

3. The rope clamp means as defined in claim 1 being particularly characterized in that said first pair of ears are longer than said second pair of ears.

4. The rope clamp means as defined in claim 1 being particularly characterized in that said clamping jaw is formed from substantially ductile material.

References Cited

UNITED STATES PATENTS

| | | | |
|---|---|---|---|
| 673,658 | 5/1901 | Lawler | 24—129WUX |
| 3,418,787 | 12/1968 | Smith | 24—123WX |

FOREIGN PATENTS

| | | | |
|---|---|---|---|
| 726,365 | 1/1966 | Canada | 54—24 |

BERNARD A. GELAK, Primary Examiner

U.S. Cl. X.R.

54—24